(12) United States Patent
Heinsohn

(10) Patent No.: US 11,123,887 B2
(45) Date of Patent: Sep. 21, 2021

(54) SHEARS

(71) Applicant: KNIPEX-Werk C. Gustav Putsch KG, Wuppertal (DE)

(72) Inventor: Andreas Heinsohn, Wuppertal (DE)

(73) Assignee: KNIPEX-Werk C. Gustav Putsch KG, Wuppertal (DE)

( * ) Notice: Subject to any disclaimer, the term of this patent is extended or adjusted under 35 U.S.C. 154(b) by 0 days.

(21) Appl. No.: 16/483,849

(22) PCT Filed: Feb. 8, 2018

(86) PCT No.: PCT/EP2018/053168
§ 371 (c)(1),
(2) Date: Aug. 6, 2019

(87) PCT Pub. No.: WO2018/146191
PCT Pub. Date: Aug. 16, 2018

(65) Prior Publication Data
US 2020/0009750 A1 Jan. 9, 2020

(30) Foreign Application Priority Data

Feb. 13, 2017 (DE) .......... 10 2017 102 800
Jul. 10, 2017 (DE) .......... 10 2017 115 366

(51) Int. Cl.
*B26B 13/28* (2006.01)
*B26B 13/16* (2006.01)
*B23D 29/02* (2006.01)

(52) U.S. Cl.
CPC .............. *B26B 13/28* (2013.01); *B26B 13/16* (2013.01); *B23D 29/023* (2013.01)

(58) Field of Classification Search
CPC ......... B26B 13/16; B26B 13/28; B26B 13/12; B26B 13/14; B26B 13/00; B26B 13/02;
(Continued)

(56) References Cited

U.S. PATENT DOCUMENTS 828,110 A 8/1906 Hancock
4,031,621 A 6/1977 Arlett
(Continued)

FOREIGN PATENT DOCUMENTS

| DE | 10 2010 016 057 A1 | 8/2011 |
|---|---|---|
| GB | 596 769 A | 1/1948 |
| WO | 94/10829 A1 | 5/1994 |

OTHER PUBLICATIONS

International Search Report of PCT/EP2018/053168, dated May 17, 2018.

*Primary Examiner* — Phong H Nguyen
(74) *Attorney, Agent, or Firm* — Collard & Roe, P.C.

(57) ABSTRACT

Shears having two limbs connected at a revolute joint, each limb comprising a handle region at one end and a cutting edge at the other end. One limb is fixed relative to the revolute joint during an opening and closing movement, and one limb is movable. The limbs move between an open position and a closed position while being limited by a stop and, in the closed position, the cutting edges pass each other over substantially their entire length. On the handle side of the revolute joint, one limb extends relative to the other limb such that it is supported in a planar manner on both sides in a region of overlap with the other limb, wherein the limbs comprise surface regions which, in the closed position, rest against one another in the region in which they are on top of each other and are each exposed on the opposite side.

4 Claims, 11 Drawing Sheets

(58) Field of Classification Search
CPC ...... B26B 13/06; B23D 29/023; B23D 29/02; B23D 29/026
USPC ......... 30/254, 244, 245, 250, 251, 252, 261, 30/262
See application file for complete search history.

(56) References Cited

U.S. PATENT DOCUMENTS

| | | | |
|---|---|---|---|
| 2009/0049960 A1* | 2/2009 | Heinsohn | B25B 7/08 |
| | | | 81/416 |
| 2010/0269357 A1* | 10/2010 | Shan | A01G 3/0251 |
| | | | 30/254 |
| 2012/0060377 A1* | 3/2012 | Huang | A01G 3/0251 |
| | | | 30/244 |
| 2013/0247385 A1* | 9/2013 | Pisczak | B23D 29/002 |
| | | | 30/252 |
| 2014/0338200 A1* | 11/2014 | Quadagno | B26B 13/28 |
| | | | 30/239 |
| 2016/0113208 A1* | 4/2016 | Hsu | A01G 3/021 |
| | | | 30/251 |

* cited by examiner

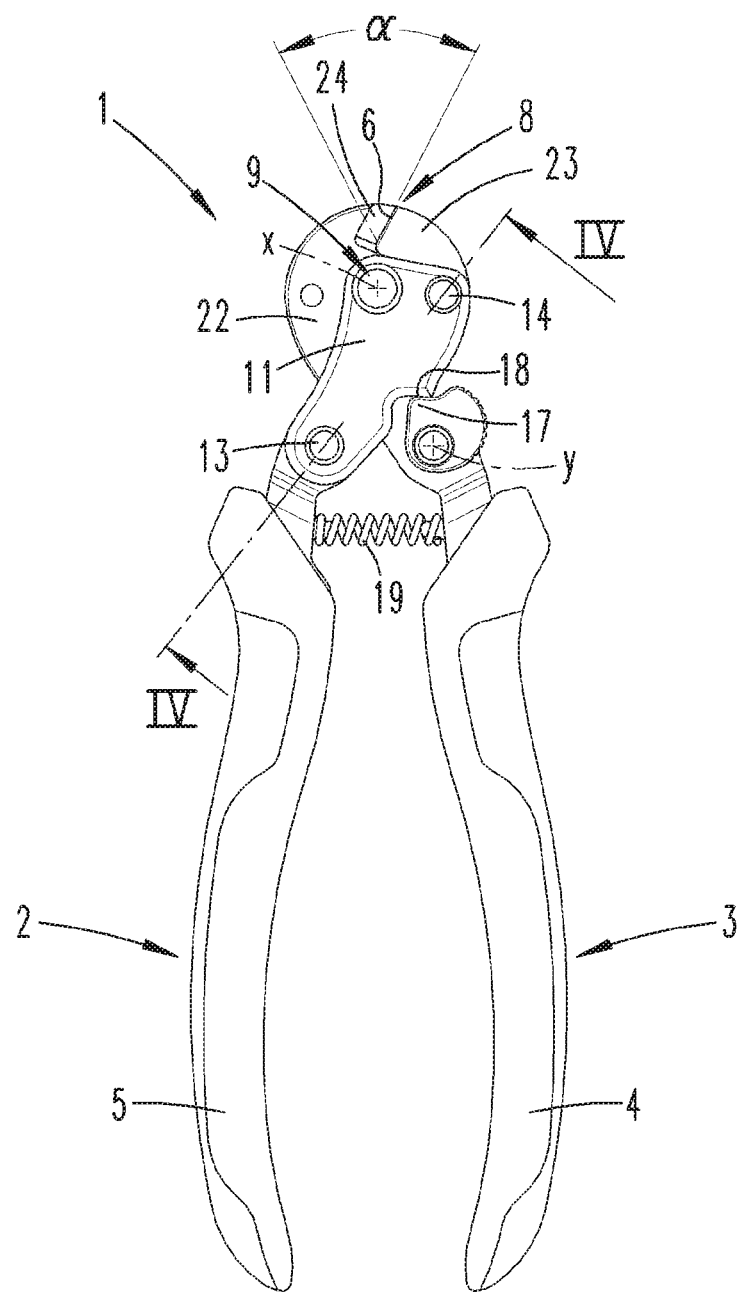

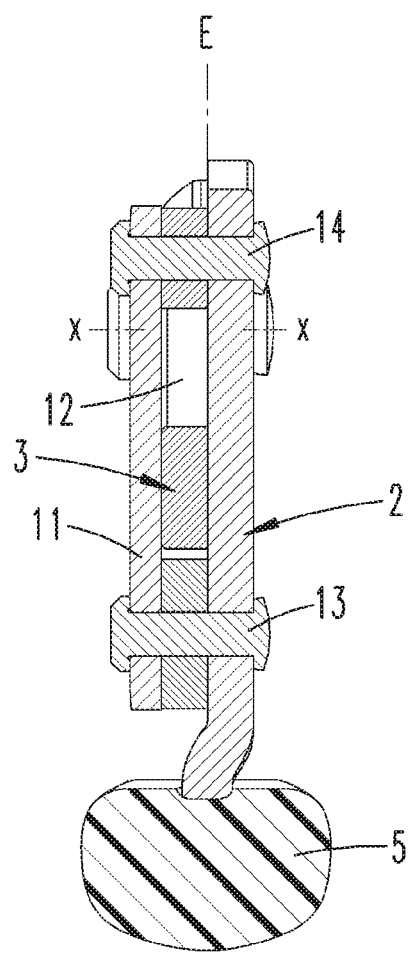
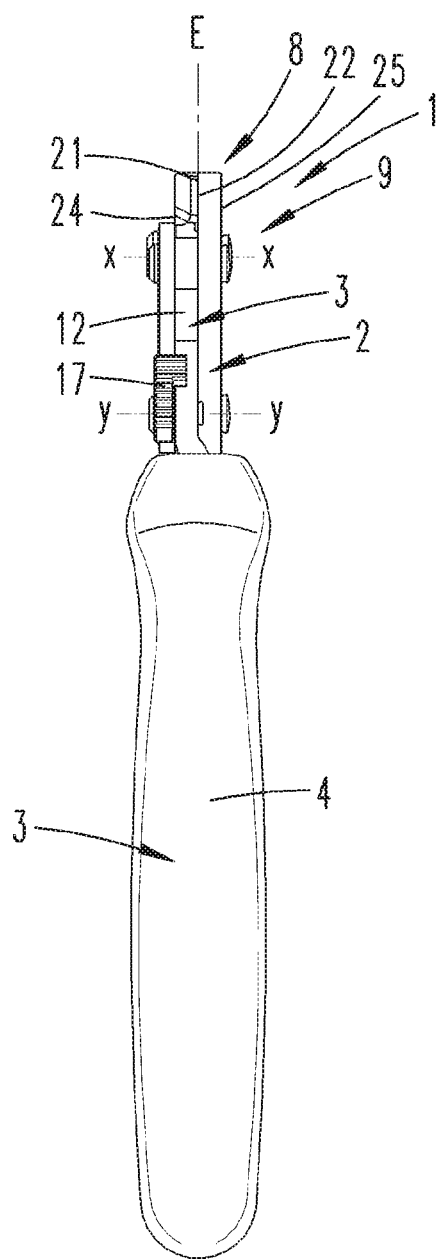

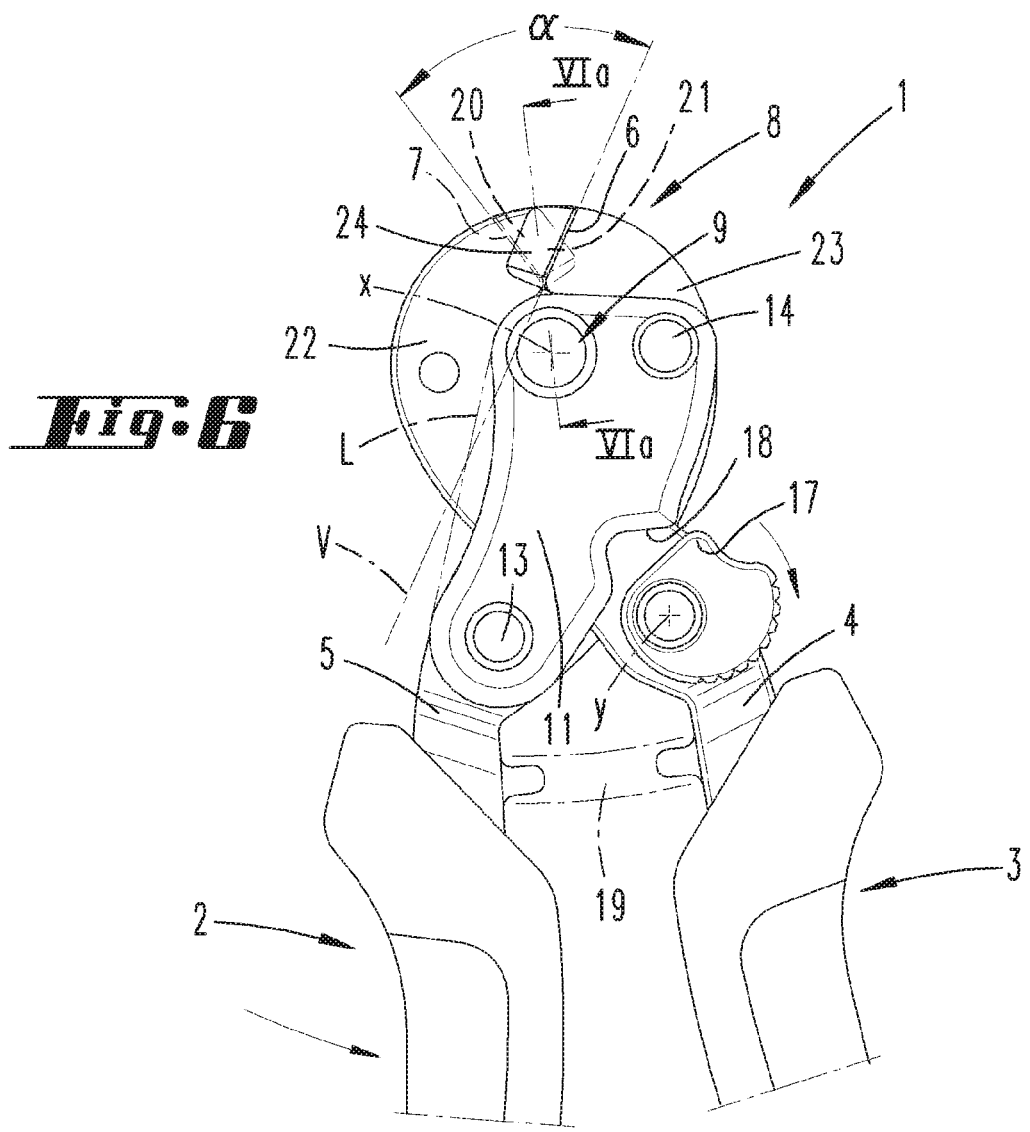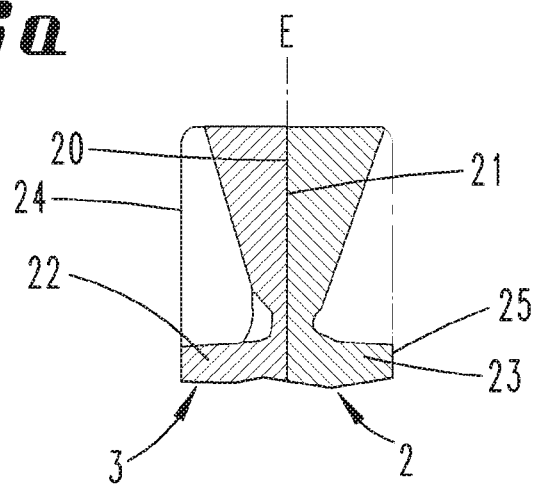

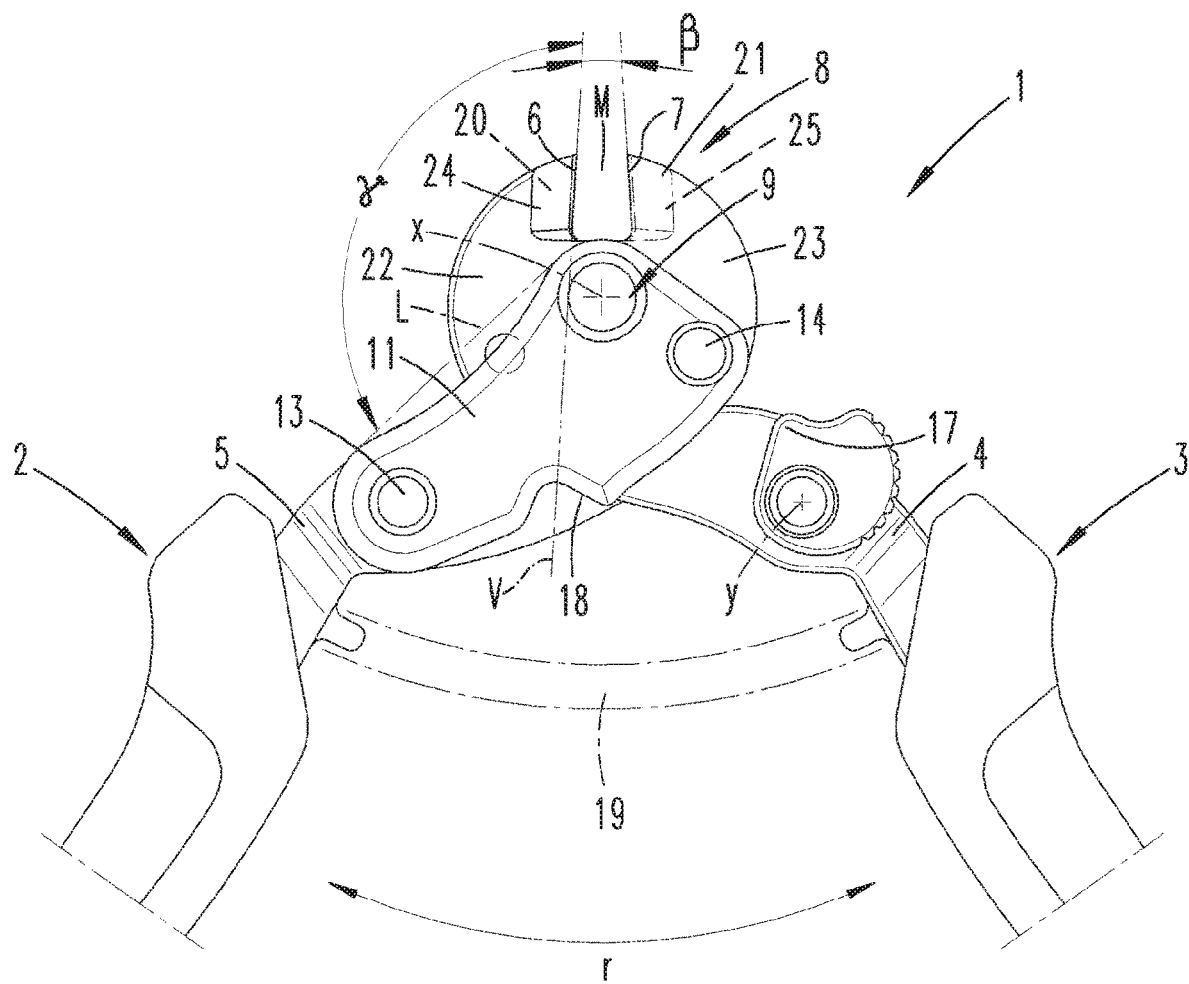

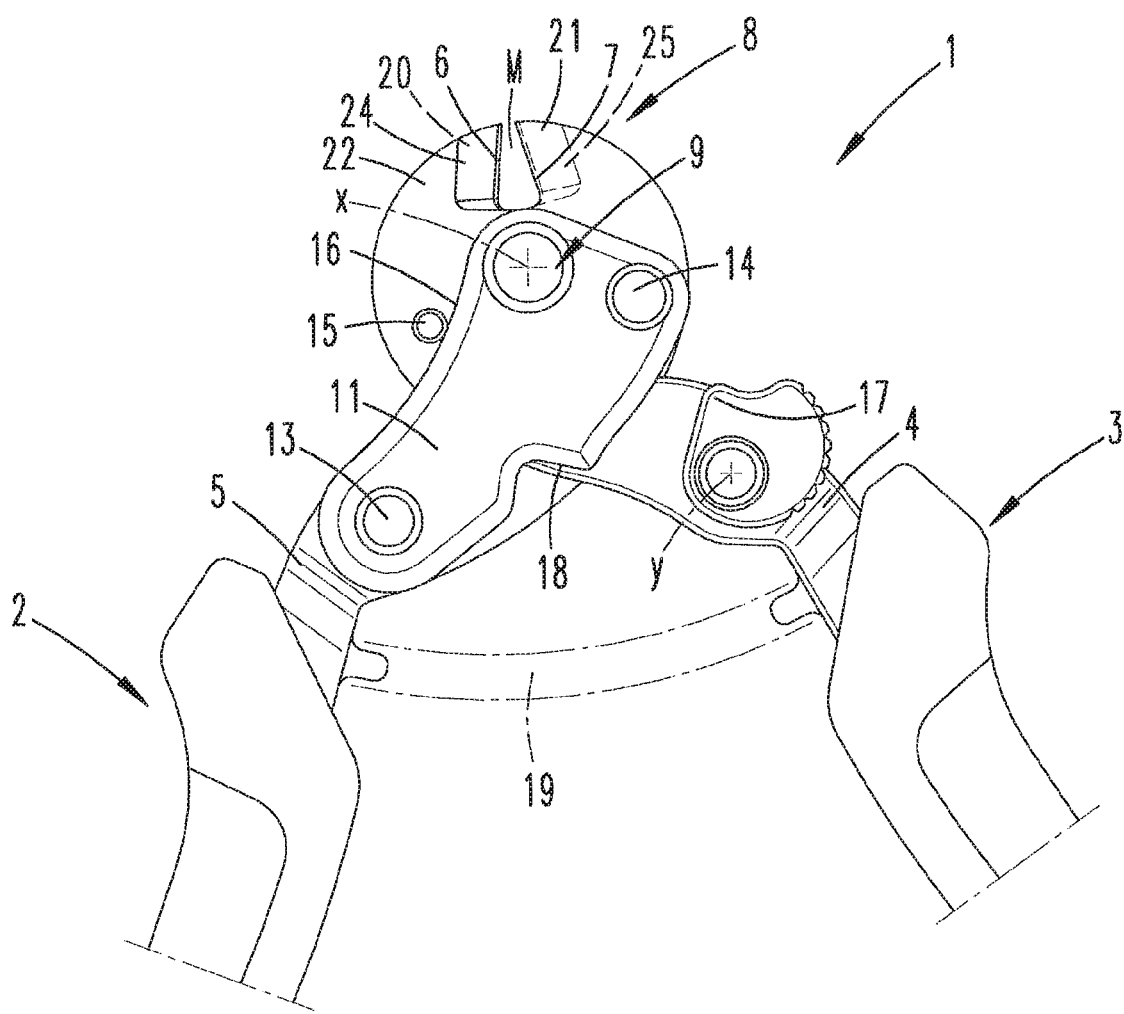

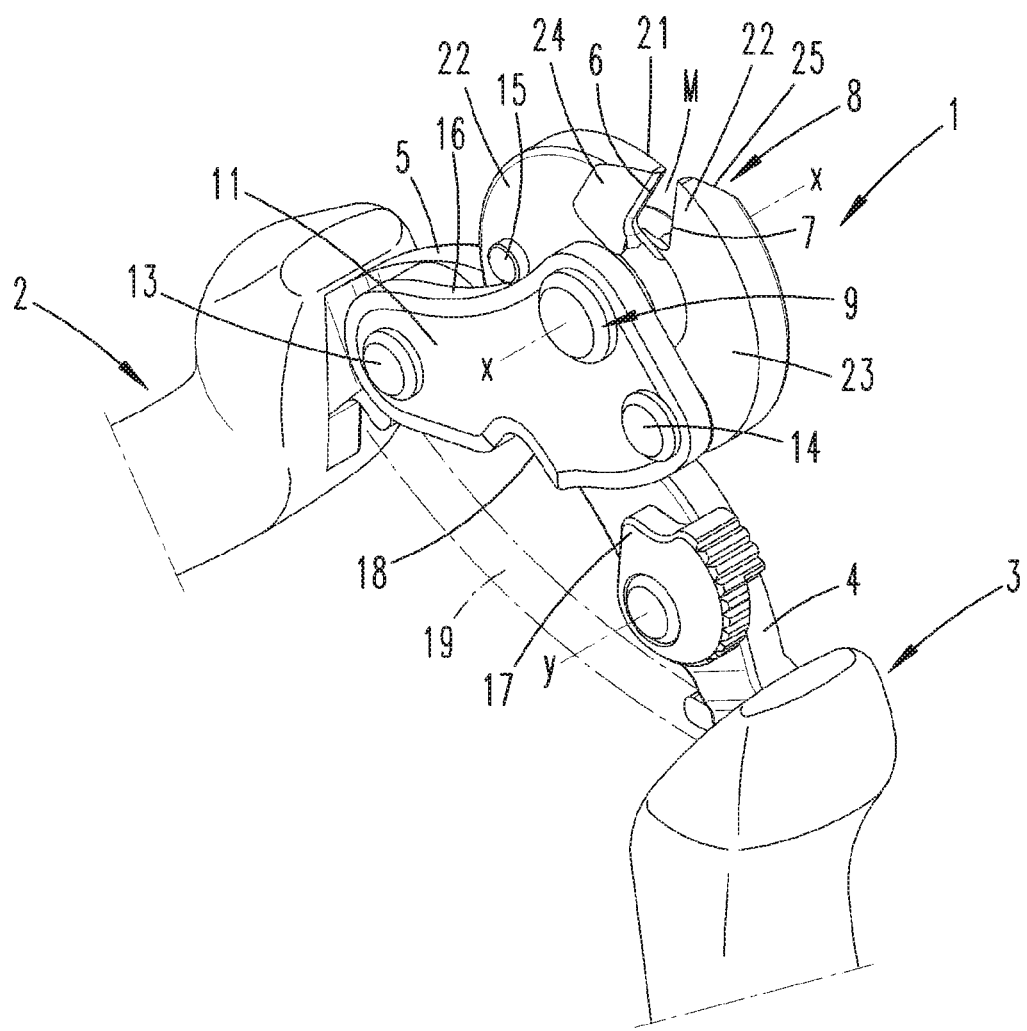

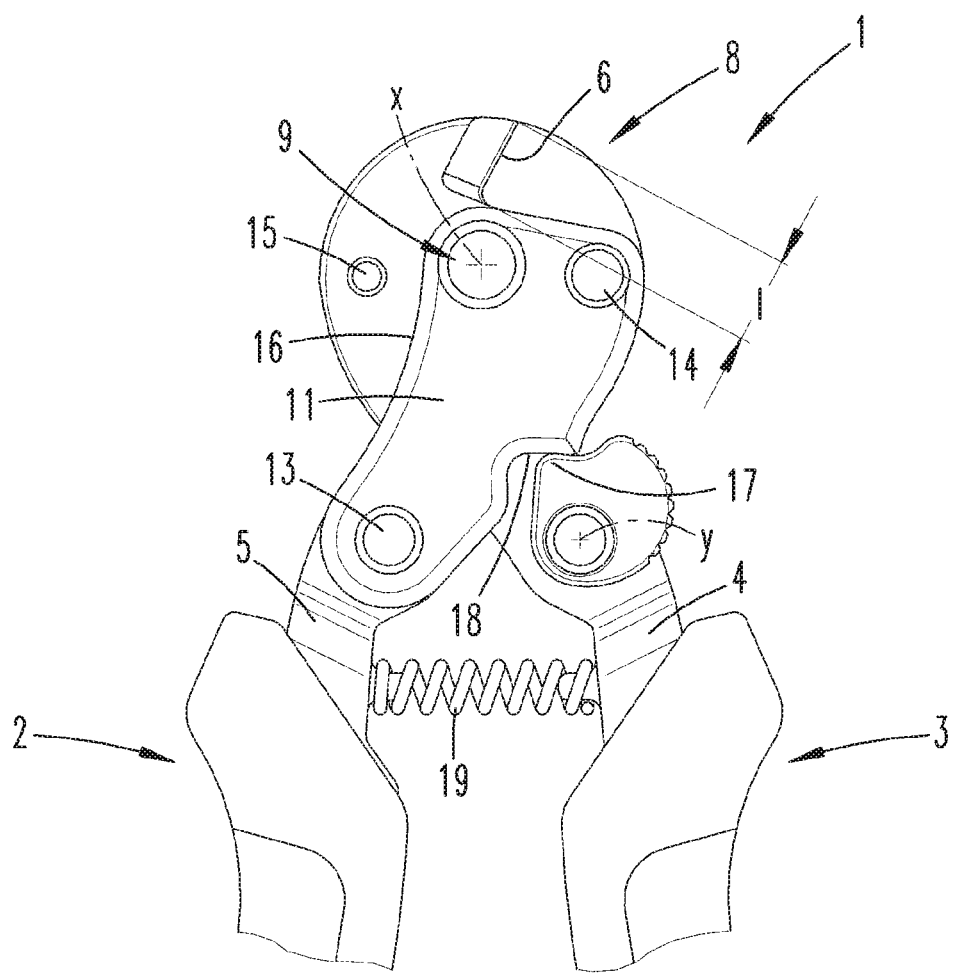

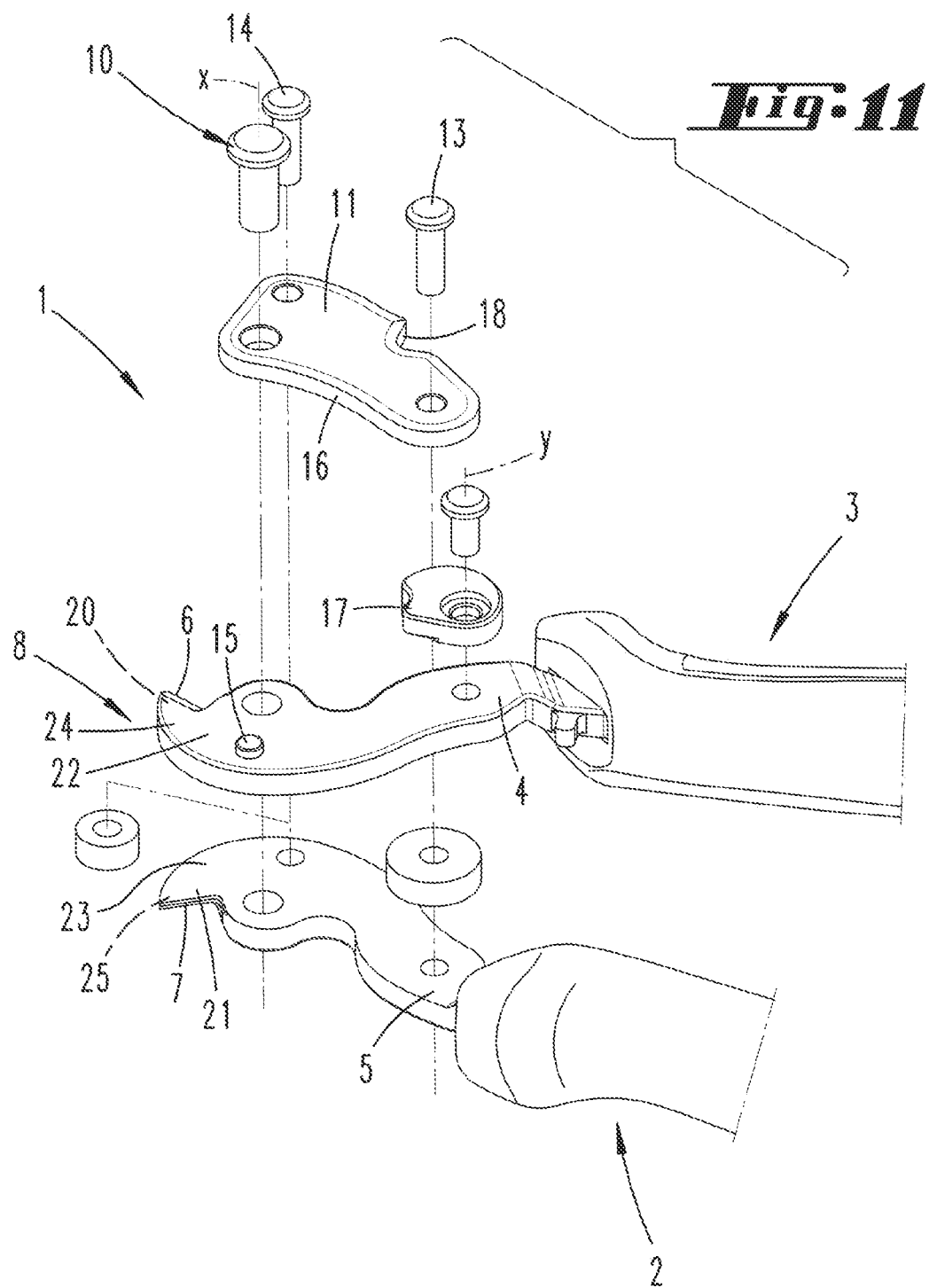

SHEARS

CROSS REFERENCE TO RELATED APPLICATIONS

This application is the National Stage of PCT/EP2018/053168 filed on Feb. 2, 2018, which claims priority under 35 U.S.C. § 119 of German Application No. 10 2017 102 800.5 filed on Feb. 13, 2017 and German Application 10 2017 115 366.7 filed on Jul. 10, 2017, the disclosures of which are incorporated by reference. The international application under PCT article 21(2) was not published in English.

FIELD OF TECHNOLOGY

The invention relates to shears having two limbs, each of which comprises a handle region at one end and a cutting edge at the other end, wherein the limbs are further connected to each other at a revolute joint, with one fixed limb that is fixed relative to the revolute joint during an opening and closing movement, and one movable limb, wherein the limbs can move between an open position and a closed position while being limited by a stop, and the cutting edges pass each other over substantially their entire length in the closed position.

PRIOR ART

Shears of the kind in question are known, for example in the form of wire rope cutters. Wire rope cutters are sometimes also referred to as pliers. Reference is also made to DE 10 2010 016 057 A1 with respect to prior art.

Known from U.S. Pat. No. 4,031,621 A are shears in which the limbs can be moved between an open and closed position while being limited by a stop, and the cutting edges pass each other over substantially their entire length in the closed position.

For example, when cutting wire ropes or other cutting materials that lead to excessively high shearing forces, a twisting can arise in the region of at least one limb in shears of the designated kind. This twisting can lead to a jamming of the shears and/or an unclean to incomplete cut.

SUMMARY OF THE INVENTION

Proceeding from the described prior art, the task of the invention is to indicate shears that allow functionally reliable handling even for cutting material requiring high shearing forces, as well as the best possible cutting result.

This object is initially achieved in one embodiment, wherein the focus is placed on having the fixed or movable limb extend relative to the movable or fixed limb on the handle side of the revolute joint such that it is supported in a planar manner on both sides in a region of overlap with the movable or fixed limb, wherein the limbs comprise surface regions that rest against one another in the region in which they are on top of each other in the closed state, i.e., in the closed position, and are each exposed on the opposite side (on the handle side relative to the revolute joint), wherein the support is achieved via a double connection between the plate-like region that overlaps the supported limb in its width direction on a broad side and the supporting limb.

This object is further achieved according to another embodiment of the invention, wherein the focus is placed on providing a support plate that overlaps the one limb facing away from the other limb, connecting the support plate with the other limb while leaving a penetration slot, wherein the penetration slot is bounded by facing flat sides of the other limb and support plate, wherein a slot width of the penetration slot viewed in a direction of extension of a rotational axis essentially corresponds to the thickness of the other limb (3) viewed in the same direction in the region passing through the penetration slot, and that a stop pin is arranged on the one limb, extending in the direction of the rotational axis, and interacting with a facing edge surface of the support plate in a stop-limiting manner.

Indicated as a result of this configuration is a functionally reliable shear configuration. In particular during a cutting process, this provides a reliable support for the region of the one limb against the region of the other limb, preferably on both sides as viewed in the direction of extension of the revolute axis. In any event, the limbs are exposed in the closed position of the pliers on the other side of the revolute axis as viewed from the handle side of the limbs, on the opposite side relative to the overlapping regions. As a consequence, in particular the regions of the cutting edges are exposed in this position on their respective—as viewed in the direction of the revolute axis—outer surfaces.

The support on both sides is thus preferably not provided in the entire region of the movable cutting edges, to the extent that they can pass each other.

The surface regions of the limbs that adjoin the cutting edges in the rotational direction of the limbs and face toward each other in the alignment of the revolute axis rest against each other in the closed shear position. The respective sides that face outwardly, and thus away from each other, in the alignment of the revolute axis, in particular the outer surface regions that adjoin the cutting edge in the rotational direction of the limbs, are exposed in this closed shear position, and correspondingly not covered. This results in a conveniently handleable shear with a slim design in the cutting region.

It can further be provided that the cutting edges open in a V shape in the closed state in a projection in the direction of a rotational axis of the revolute joint. The V-tip is preferably designed facing the revolute joint. Proceeding from there, the cutting edges extend at an acute angle to each other in a closed state, e.g., at an angle of about 10°, 15° or up to 30°.

It can also be provided that the length of one cutting edge which the other cutting edge has passed over in the closed state be smaller than a largest width measured transverse to a longitudinal extension of the supported limb in the supported region, over which the supported limb is supported on both sides. The length of the cutting edge can exemplarily measure one tenth to nine tenths, and further exemplarily three tenths to six tenths, of the width described above. The largest width preferably arises transversely directed relative to a longitudinal alignment of the supported limb in the supported region and/or in the longitudinal direction of the supporting limb in the supporting region.

In addition, it can be provided that the support be achieved via a double connection between the plate-like region that overlaps the supported limb in its width direction on a broad side and the supporting limb.

For example, the connection can be achieved by riveting or screwing, alternatively by welding or high-strength adhesive bonding. The connection can further be provided by an integral, if necessary and also preferably materially uniform configuration of the supporting section and the limb connected thereto.

In this conjunction, it can further be provided that the connection be provided at least once on each respective side of the supported limb. Alternatively, it is proposed in this regard that the connection only be provided on one side of the supported limb.

BRIEF DESCRIPTION OF THE DRAWINGS

The invention is explained below based upon the attached drawing; however, the latter only shows exemplary embodiments. Therefore, a part explained only as relates to one of the exemplary embodiments and is not replaced by another part in a further exemplary embodiment owing to the characteristic feature highlighted therein is also described for this further exemplary embodiment as an at least possibly present part. The drawing shows:

FIG. 3 another view representation of the shears;

FIG. 4 the section according to line IV-IV on FIG. 3;

FIG. 5 a side view of the shears;

FIG. 6 another perspective view of the shears, in the closed position;

FIG. 6a the magnified depicted section according to line VIa-VIa on FIG. 6;

FIG. 7 a view corresponding to FIG. 6, but in the open position;

FIG. 8 a view corresponding to FIG. 7, but an embodiment with a provided stop pin, in the open shear position;

FIG. 9 a perspective view of the shears according to FIG. 8;

FIG. 10 the cutting head according to FIG. 8 in the closed position;

FIG. 11 a perspective, exploded view of the shears;

DESCRIPTION OF THE EMBODIMENTS

Figure 1:
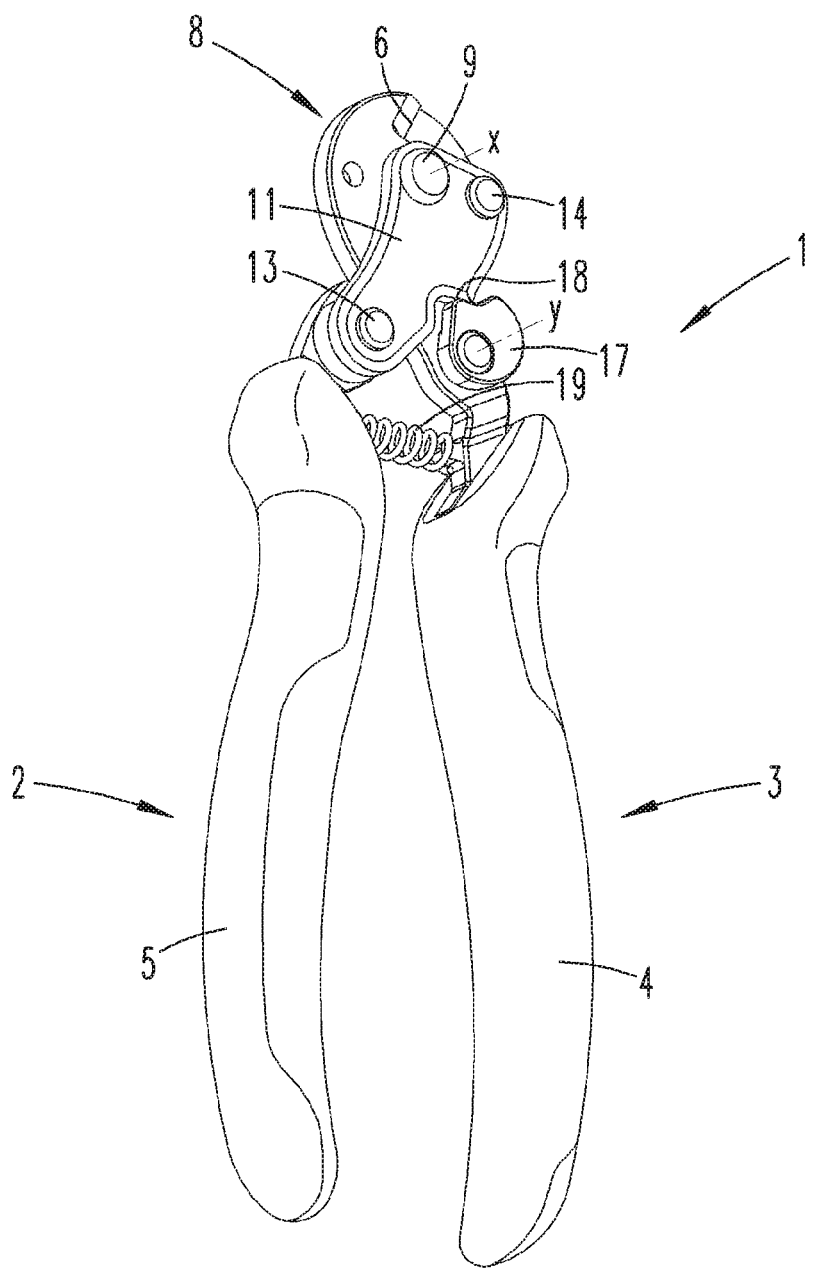
FIG. 1 a perspective view of shears of the kind in question, in the closed position.

As shown and described, initially with reference to FIG. 1, are shears 1 with two limbs 2, 3, wherein each limb 2, 3 forms a handle region 4 and 5, and cutting edges 6, 7 at the end region facing away from the handle region 4, 5. The end regions forming the cutting edges 6, and 7 together comprise a cutting head 8 with a cutting jaw M bounded by the cutting edges 6 and 7 in the open position (e.g., see FIG. 7).

The limbs 2 and 3 are joined together in a revolute joint 9. The joint pin 10 preferably provided for this purpose extends perpendicularly to the cutting plane E with its geometric rotational axis x. The resultant rotational direction of one of the legs 2 or 3 around the rotational axis x is marked r (see FIG. 7).

The end regions of the limbs 2, 3 facing away from the handle regions 4, 5 have the cutting edges 6 and 7, and are designed to completely pass by each other during the closing movement of the cutting edges 6 and 7 in the cutting plane E. Preferably involved is a plate-shaped formation of the end regions, wherein respective plate edges are formed as the mentioned cutting edges 6 and 7.

The cutting edges 6 and 7 preferably extend exclusively in the limb regions facing away from the handle regions 4 and 5 beyond the revolute joint 9 and each have a length l.

The legs 2 and 3 preferably have a wide, plate-like design, and lie one on top of the other, intersecting in the revolute joint region of the facing flat sides.

Figure 12:
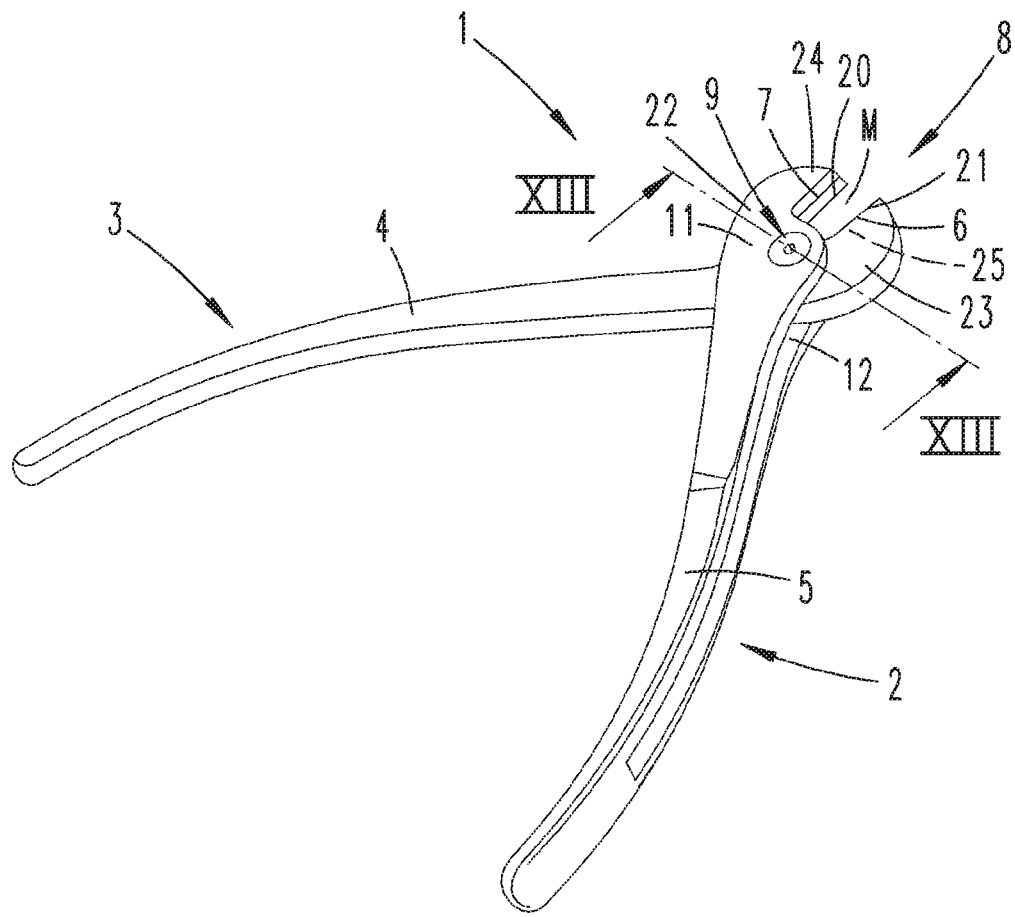
FIG. 12 a perspective view of the shears in another embodiment.
Figure 13:
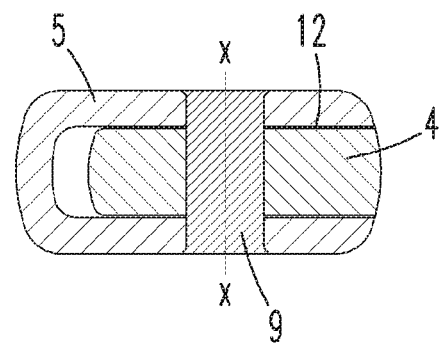
FIG. 13 the section according to line XIII-XIII on FIG. 12.

One of the limbs 2, 3 is supported on both sides in a planar manner on the handle side of the revolute joint 9, overlapping the other limb. According to the embodiment on FIGS. 12 and 13, this can be accomplished with a correspondingly slotted limb, through which the other limb is pushed. This results in an integral, materially uniform configuration of both overlapping regions by the one limb.

As shown in the other illustrations according to FIGS. 1 to 11, a support plate 11 can alternatively be provided that overlaps the one limb, here limb 3, facing away from the other limb. In the depicted exemplary embodiments, this support plate 11 is connected with limb 2, and specifically preferably only with limb 2, leaving a penetration slot 12. This penetration slot 12 is correspondingly bounded by facing flat sides of the limb 2 and support plate 11, wherein a slot width c of the penetration slot 12 viewed in a direction of extension of the rotational axis x can preferably essentially correspond to the thickness of the other leg 3 viewed in the same direction in the region passing through the penetration slot 12.

In relation to a view according to FIG. 3, the support plate 11 is fastened to limb 2 below the revolute joint 9, preferably on both sides of the overlapped and supporting limb 3 (connections 13, 14). A riveted attachment is shown.

Viewed in the direction of extension of the rotational axis x, the support plate 11 can have a thickness that can correspond to about the thickness of the limb 2 and/or 3 measured in the same direction in the penetrated region, further to about 0.5 to 1.5 times a leg thickness.

Beginning spaced apart from the facing end of the handle region 5 of limb 2, the support plate 11 further extends until into the region of the section of the limb 2 that helps form the cutting head 8, while the cutting head region that directly surrounds the cutting edge 6 is exposed. As shown, the pin of the revolute joint 9 can also pass through the support plate 11.

A width b of the supported limb 3 in the overlapped region, i.e., in the region of the penetration slot 12, measured transverse to the longitudinal extension of the limb 3, can correspond to about 2 to 4 times the length l of a cutting edge 6, 7.

Figure 2:
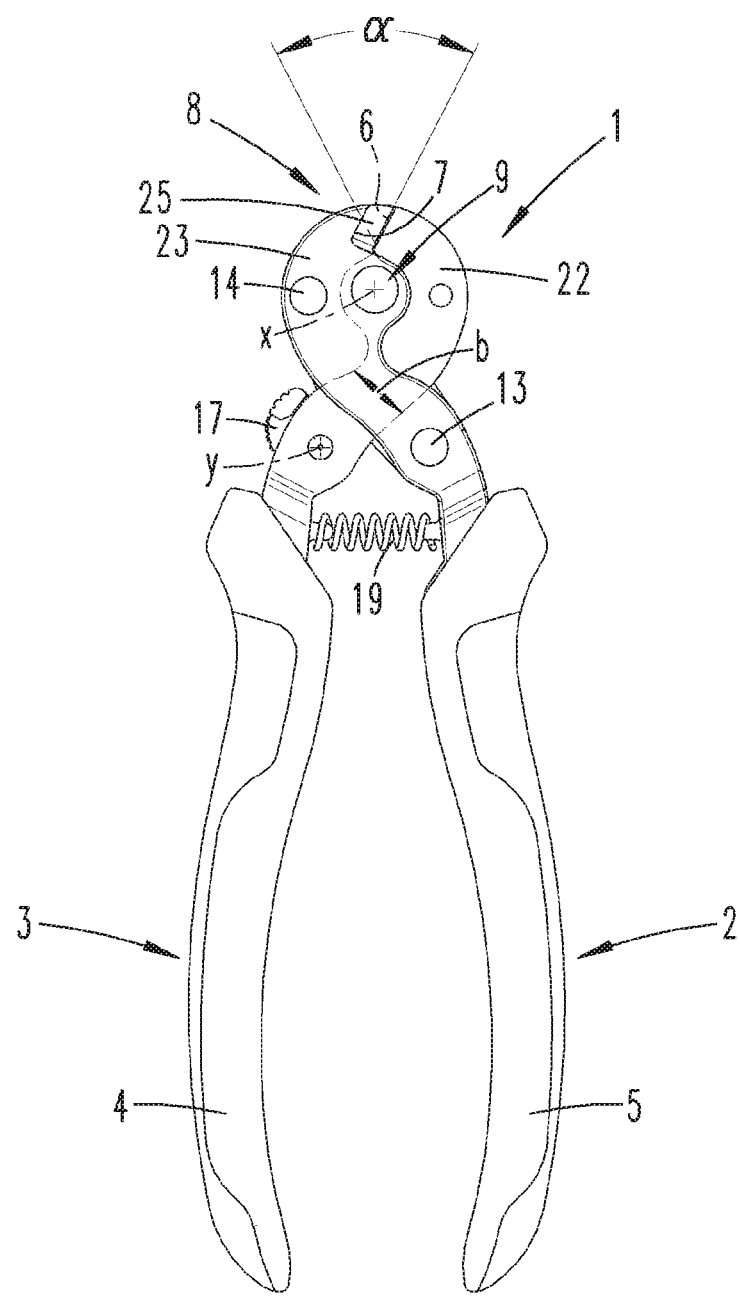
FIG. 2 an elevation view of the shears.

As evident from the views on FIGS. 2 and 3, the cutting edges 6 and 7 in the closed state of the shears 1 project in a direction of the rotational axis x of the revolute joint 9 so as to open in a V shape, as also caused by the overlapping of the limb sections that have the cutting edges 6 and 7. An angle α of about 30° can establish itself between the cutting edges 6 and 7.

In the closed shear position shown by example on FIG. 6, the surface regions 20 and 21 of the limb sections 22 and 23 with cutting edges 6 and 7 facing toward each other in the alignment of the rotational axis x rest against each other due to the overlapped position that arises in this closed position, while the sides 24 and 25 of the limb sections 22 and 23 with cutting edges 6 and 7 facing axially outward with reference to the alignment of the rotational axis x are exposed in this position, and at least in the closed shear position are thus not covered (see also FIG. 6a).

As further evident from the views on FIGS. 8 and 10, a stop pin 15 can be arranged in one of the limbs, here in the leg 3 supported on both sides. It extends in the direction of the rotational axis x, and interacts with a facing edge surface 16 of the support plate 11 in a stop-limiting manner, establishing an opening limitation over the latter.

In addition, a pivotable locking projection 17 can be provided. The latter can also be arranged around a rotational axis y directed identical to rotational axis x on the overlapped and supported limb 3, so as to interact with a step 18 formed in the support plate 11.

A return spring 19 can also be provided between the limbs 2, 3 on the handle regions 4, 5, acting in the direction toward a spread handle position.

With reference to a view according to FIG. 6, in which the rotational axis x is depicted as a point, an imagined elongation V of the cutting edge 6 of limb 3 intersects an imagined line L of the support plane in this closed position of the shears 1. This line L represents an imagined shortest connection of the contour of the support plane 11 in this view between the region of the support plate 11 having the connection 13 and the region of the support plate 11 having the revolute joint 9. The elongation V intersects this line L from the inside out with reference to the support plate 11, wherein the elongation V can include an acute angle relative to the line L of up to 15°, for example, and further of 5 to 10°, for example.

In the open position according to FIG. 7, the cutting edges 6 and 7 in the view described above include an acute angle β of about 75 to 89° relative to each other, and further of about 80 to 85°, for example. The imagined elongation V of the cutting edge 6 intersects the support plate 11, here tangent to about the revolute joint 9, wherein the cutting edge 6 in this open position further includes an obtuse angle γ relative to the line L described above of about 120 to 150°, further of about 135°, for example.

The cutting edge 7 of the limb 2 also includes an obtuse angle relative to the edge line of the support plate 11 facing it of about 120 to 150°. As opposed to the acute angle γ, however, this obtuse angle does not change during the pivoting displacement of the limbs, since the limb 2 is non-rotatably connected with the support plate 11.

The above statements serve to explain the inventions encompassed by the application as a whole, which each independently further develop the prior art by at least the following feature combinations, wherein two, several or all of these feature combinations can also be combined, specifically:

Shears, characterized in that, on the handle side of the revolute joint 9, the fixed or movable limb 2, 3 extends relative to the movable or fixed limb 3, 2 such that it is supported in a planar manner on both sides in a region of overlap with the movable or fixed limb 2, 3, wherein the limbs 2, 3 further comprise surface regions that rest against one another in the region in which they are on top of each other, and are exposed on the opposite side.

Shears, characterized in that the cutting edges 6, 7 [the cutting edges 6, 7] open in a V shape in the closed state in a projection in the direction of a rotational axis x of the revolute joint 9.

Shears, characterized in that the length L of one cutting edge 6, 7 which the other cutting edge 7, 6 has passed over in the closed state is smaller than a largest width b measured transverse to a longitudinal extension of the supported limb in the supported region, over which the supported limb is supported on both sides.

Shears, characterized in that the support is achieved via a double connection 13, 14 between the plate-like region that overlaps the supported limb in its width direction on a broad side and the supporting limb.

Shears, characterized in that the connection is provided at least once on each respective side of the supported limb.

Shears, characterized in that the connection is only provided on one side of the supported limb.

All disclosed features are essential to the invention, whether taken separately or in combination with each other.

The disclosure of the application hereby also includes the disclosure content of the accompanying/attached priority documents (copy of prior application) in its entirety, including for the purpose of also incorporating features in these documents into the claims of the present application. The features in the subclaims characterize independent inventive further developments of prior art, in particular so as to generate partial applications based upon these claims. The invention indicated in each claim can additionally have one or several of the features indicated in the above specification, in particular ones provided with reference numbers and/or indicated in the reference list. The invention also relates to embodiments in which individual features from among those mentioned in the above specification are not realized, in particular to the extent that they are clearly unnecessary for the respective intended purpose or can be replaced by other technically equivalent means.

REFERENCE LIST

1 Shears
2 Limb
3 Limb
4 Handle region
5 Handle region
6 Cutting edge
7 Cutting edge
8 Cutting head
9 Revolute joint
10 Joint pin
11 Support plate
12 Penetration slit
13 Connection
14 Connection
15 Stop pin
16 Edge surface
17 Locking projection
18 Step
19 Return spring
20 Surface region
21 Surface region
22 Limb section
23 Limb section
24 Side
25 Side
b Width
c Slit width
l Length
r Rotational direction
x Rotational axis
y Rotational axis
E Cutting plane
L Line
M Cutting jaw
V Elongation
α angle
β angle
γ angle

The invention claimed is:

1. Shears comprising two limbs, each limb comprising a handle region at one end and a cutting edge at another end, wherein the limbs are connected to each other at a revolute joint, so that one of the limbs is a fixed limb that is fixed relative to the revolute joint during an opening and closing movement, and one of the limbs is a movable limb, wherein the limbs are configured to move between an open position and a closed position while being limited by a stop, and the cutting edges pass each other over substantially their entire length in the closed position, wherein one of the limbs extends relative to the other of the limbs on a handle side of the revolute joint, wherein the one limb has two planar sides and two face sides, the face sides extending between the planar sides at edges of the planar sides, such that the one limb is supported in a planar manner on both planar sides in a region of overlap with the other limb, wherein the limbs comprise surface regions that rest against one another in an area in which the limbs are on top of each other in the closed state, and are each exposed on an opposite side, and wherein the one supported limb is disposed between a plate-like region that overlaps the supported limb in a width direction on the planar side, and the supporting limb, wherein the plate like region and the supporting limb are connected to each other via two separate connections, with both of the connections being disposed outside of the supported limb and without penetrating the supported limb.

2. Shears comprising two limbs, each limb comprising a handle region at one end and a cutting edge at another end, wherein the limbs are connected to each other at a revolute joint, and comprise one fixed limb that is fixed relative to the revolute joint during an opening and closing movement, and one movable limb, wherein the limbs are configured to move between an open position and a closed position while being limited by a stop, and the cutting edges pass each other over substantially their entire length in the closed position, wherein one of the limbs extends relative to the other of the limbs on a handle side of the revolute joint, wherein the one limb has two planar sides and two face sides, the face sides facing a movement direction, such that the one limb is supported in a planar manner on both planar sides in a region of overlap with the other limb, wherein the limbs comprise surface regions that rest against one another in an area in which the limbs are on top of each other in the closed state, and are each exposed on an opposite side, and further comprising a support plate that overlaps the one limb facing away from the other limb, wherein the support plate is connected with the other limb while leaving a penetration slot, wherein the penetration slot is bounded by facing flat sides of the other limb and support plate, wherein a slot width (c) of the penetration slot viewed in a direction of extension of a rotational axis (x) essentially corresponds to a thickness of the other limb viewed in a same direction in a region passing through the penetration slot, and wherein a stop pin is arranged on the one limb, extending in the direction of the rotational axis (x), and interacting with a facing edge surface of the support plate in a stop-limiting manner, wherein support of the one limb is achieved via a two separate connections with at l st ono both of the connections being disposed outside of the supported limb and without penetrating the supported limb.

3. The shears according to claim 1, wherein the cutting edges extend in a V shape in the closed state in a radial direction from a rotational axis (x) of the revolute joint.

4. The shears according to claim 1, wherein the length of one of the cutting edges which the other cutting edge has passed over in the closed state is smaller than a largest width (b) measured transverse to a longitudinal extension of the supported limb in the supported region, over which the supported limb is supported on both sides.

* * * * *